United States Patent [19]

Ahne et al.

[11] 4,302,233

[45] Nov. 24, 1981

[54] METHOD FOR THE MANUFACTURE OF A HIGH-TENSILE-STRENGTH LIGHT WAVE-GUIDE

[75] Inventors: Hellmut Ahne, Röttenbach; Hubert Aulich, Munich; Friedrich Weidinger, Taufkirchen; Roland Rubner, Röttenbach, all of Fed. Rep. of Germany

[73] Assignee: Siemens Aktiengesellschaft, Munich, Fed. Rep. of Germany

[21] Appl. No.: 179,471

[22] Filed: Aug. 19, 1980

[30] Foreign Application Priority Data

Aug. 21, 1979 [DE] Fed. Rep. of Germany ....... 2933856

[51] Int. Cl.³ ............................................. C03C 25/02
[52] U.S. Cl. ..................................... 501/3.43; 427/163
[58] Field of Search ................. 65/3.43, 3.11; 427/163

[56] References Cited

U.S. PATENT DOCUMENTS

| Re. 30,186 | 1/1980 | Rubner et al. | 430/325 |
|---|---|---|---|
| 3,816,160 | 6/1974 | Moore | 65/3.11 X |
| 3,957,512 | 5/1976 | Kleeberg et al. | 430/330 X |
| 4,088,489 | 5/1978 | Rubner et al. | 430/322 |
| 4,115,087 | 9/1978 | Martin | 65/3.43 |
| 4,116,654 | 9/1978 | Trehu | 65/3.11 |

*Primary Examiner*—Robert L. Lindsay, Jr.
*Attorney, Agent, or Firm*—Kenyon & Kenyon

[57] ABSTRACT

The present invention relates to a method for the manufacture of a high-tensile-strength light waveguide with a plastic layer on the optical fiber, in which a hardenable polymer precursor stage is applied to the optical fiber. Uniform, thick layers are produced in a single operation in a process comprising applying an oligomeric and/or polymeric polyaddition or polycondensation product to the optical fiber from a solution and subsequently irradiating with actinic light and/or performing a thermal treatment. The polyaddition or polycondensation product is made from a carbocyclic or heterocyclic compound which carries two functional groups suitable for addition or condensation reactions, and a diamine, a diisocyanate, a bis-acid chloride or a dicarboxylic acid. The carbocyclic or heterocyclic compound has in a position adjacent to the functional groups partially ester, amide, urethane or urea groupings which may be of an unsaturated nature. The light waveguides made by the method according to the invention are suitable particularly for purposes of optical information transmission.

5 Claims, No Drawings

METHOD FOR THE MANUFACTURE OF A HIGH-TENSILE-STRENGTH LIGHT WAVE-GUIDE

BACKGROUND OF THE INVENTION

The present invention relates to a method for the manufacture of a high-tensile-strength light waveguide with a plastic layer provided on the optical fiber thereof, by applying a hardenable polymer precursor stage to the optical fiber immediately after the fiber-drawing process.

Light waveguides consist essentially of optical fibers which have an index-of-refraction profile such that incident light is guided in them, following all curves. They can, therefore, serve as a transmission medium. For the optical transmission of information, light waveguides are required which, in addition to low optical losses, also exhibit high tensile strength. The light waveguides presently used for the transmission of information therefore consist of glass, a material with a theoretically very high tensile strength based on the bonding strength of the glass components. To obtain this high tensile strength in the glass fibers, the optical fibers are jacketed immediately after the drawing process with a protective layer of plastic. The optimum layer thickness of the plastic film depends on the mechanical properties of the latter such as the modulus of elasticity and the hardness, and is in general 10 to 100 $\mu$m. According to experience, layer thicknesses of less than 10 $\mu$m lead to damage to the glass surface, which reduces the tensile strength of the fiber drastically.

After the coating, the fiber is jacketed in an extrusion process with loosely or firmly adhering plastic tubing in order to protect the optical fibers against mechanical stresses. This cabling process assumes that the tensile strength of the fiber is high enough after the application of the first protective plastic film, and that the softening point of the plastic layer is above the temperature occurring in the extruder head, such that the optical fiber does not stick to the plastic tubing in the extrusion process.

In the coating of optical fibers with plastic in order to obtain high tensile strength and for protection against mechanical damage, the bare fiber passes immediately after the drawing process through one or more coating devices, which are followed by respective drying sections (ovens) for hardening the plastic. For this varnishing technique, non-reactive coating materials, i.e., soluble polymers such as cellulose acetate, polyvinylidene fluoride or polyesterimide can be used (see "Siemens Forsch.-u.Entwickl.-Ber." Vol. 6, 1977, No. 5, Pages 314 to 319). It is a disadvantage of this technique that typically only very thin layers (about 5 $\mu$m) can be applied uniformly in one coating operation. With thicker layers, the film of liquid is broken apart when the fiber enters the hardening oven due to the sudden reduction of the viscosity, and the material flows along the fiber before hardening sets in, resulting in nonuniform coating (so-called "pearl-string effect"). For sufficiently thick protective layers, two or more coating operations are, therefore, required.

With reactive coating materials such as epoxy resins (see "Siemens Forsch.-u.Entwickl.-Ber.," Vol. 7, 1978, No. 3, Pages 158 to 165), which up to now have been used without solvent, only thin layers can be applied uniformly in one coating operation with thermal hardening. While a thickness of about 30 $\mu$m per coating cycle can be reached if thermally cross-linkable polysiloxanes are used, such a protective layer is very soft and easily damaged. For this reason, a second coating process is generally necessary.

As an alternative to the thermally hardening systems mentioned, UV-cross-linkable epoxy acrylates have also been used recently as coating material (U.S. Pat. No. 4,099,837). There, a polymerization product of a mixture of polymer precursor stages, which are obtained by reaction of acrylic acid with a mixture of an aliphatic and an aromatic diglycidyl ether, is located on the glass fiber. In such systems, layer thicknesses of 20 to 50 $\mu$m are supposed to be obtained in one coating operation; however, it is unclear at this time what the aging behavior of the materials mentioned and their influence on the static fatigue of the optical fibers are.

SUMMARY OF THE INVENTION

It is an object of the present invention to further improve a method of the above-mentioned type for the manufacture of a high-tensile-strength light waveguide. It is to be achieved in particular that the coating material is chemically stable vis-a-vis the glass surface and against corrosive environment influences, adheres well to the fiber surface, does not affect the optical properties of the optical fibers in the temperature range from $-50°$ to $+80°$ C. and hardens quickly into smooth, non-sticky layers of uniform thickness also at high fiber pulling velocities. Additionally, it is further desired to produce relatively thick layers in one coating operation.

According to the invention, these objects are achieved by applying to the optical fiber, from a solution, an oligomeric and/or polymeric polyaddition or polycondensation product of a carbocyclic or heterocyclic compound carrying two carboxyl, carboxylic-acid chloride, amino, isocyanate or hydroxyl groups suitable for addition or condensation reactions, and a diamine, a diisocyanate, a bis-acid chloride or a dicarboxylic-acid, where the carbocyclic or heterocyclic compound has partially, in a position adjacent to the groups suitable for addition or condensation reactions, ester, amide, urethane or urea groupings which are optionally unsaturated; and subsequently by irradiating with actinic light and/or by thermal treatment.

The method according to the present invention has, in particular, the following advantages:

Sufficiently thick and non-sticking protective layers with a uniform thickness of about 20 to 25 $\mu$m;

High temperature stability of the protective layer up to about 400° C.;

Good adhesion of the protective layer to the fiber surface;

Low loss of solvent due to a high solids content of the solvent;

Self-extinguishing properties of the protective layer.

In the method according to the present invention for the application of the plastic layer or coating, the optical fiber passes, immediately after the drawing zone, through a coating cell which is filled with soluble, oligomeric or polymeric polyfunctional precursor stages of a highly heat-resistant polymer. The cycloaliphatic, aromatic or heterocyclic chain links of these precursors are connected by means of bridges to partial amide structures. In addition, the precursor stages have, adjacent to the bridge links, ester, amide, urethane or urea groups which are preferably of an unsaturated nature. Such components have the advantage that they solidify rapidly, preferably by cross-linking. The solidification is accomplished by a thermal treatment or by irradiation with actinic light. Through addition of monomeric and/or oligomeric mono- or polyfunctional additives, the cross-linking can further be accelerated or intensified through a heat treatment or irradiation. In addition to possible cross-linking, the heat treatment brings about particularly a cyclizing, whereby highly heat-resistant polymers such as polyimides are formed.

Dimethylacetamide or N-methylpyrrolidone can advantageously be chosen as the solvent for the polymer precursor stages, although generally, any polar organic solvent can be considered. Through a suitable choice of the precursor stage, solids contents of up to 75% can be achieved in the solution, i.e., substantially higher concentrations than in the otherwise customary varnish systems of comparable structure, in which the solids content is only about 20%. Contrary, for example, to the known polyester imides, the polymer precursors used in the method according to the invention do not tend toward association, so that high concentrations and large layer thicknesses can be obtained.

It is a further advantage of the method according to the present invention that the liquid film, when the fiber enters the drying oven, is stabilized on the fiber due to the rapid hardening of the precursor, whereby flow, and the pearl-string effect resulting therefrom, is avoided. After passing through the drying section, the hardening is complete and the solvent has evaporated completely.

By means of the method according to the present invention, uniform, thick protective layers which have high dimensional heat stability, high chemical resistance and mechanical strength as well as little flammability can be produced by a single application in efficient production. To accelerate cross-linking, compounds such as unsaturated s-triazines (for thermal cross-linking), for example, triallylcyanurate, and maleinimides (for radiation cross-linking) can be used to advantage with this method. In addition, cross-linking initiators such as azo-bis-iso-butyronitrile, dibenzoylperoxide and aromatic diazides, as well as sensitizers such as Michler's ketone, can be used. The light waveguides fabricated by the method according to the invention can advantageously be further provided, in a known manner, with a lubricating layer.

The polymer precursor stages used in the method according to the invention generally exhibit the following structure:

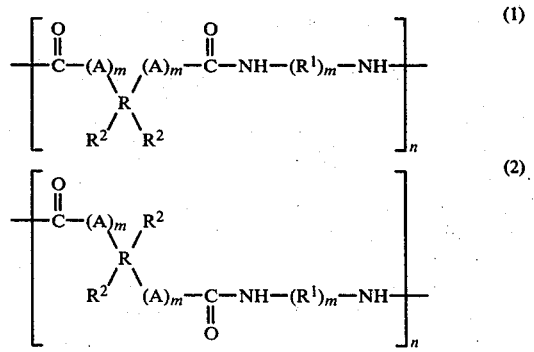

In Formulas (1) and (2), n stands for an integral number from 2 to about 100 and m=0 or 1.

The following applies to R, $R^1$, $R^2$ and A:

R is an optionally halogenated, at least partially aromatic and/or heterocyclic tetravalent, i.e., tetrafunctional, radical, in which two respective valences are arranged adjacent to each other; if the radical R has several aromatic and/or heterocyclic structure elements, then the respective valence pairs are at the end-position structure elements of this type;

$R^1$ is an optionally halogenated divalent, i.e., difunctional, radical of aliphatic and/or cycloaliphatic structure optionally having hetero atoms and/or of aromatic and/or heterocyclic structure;

$R^2$ is an optionally substituted alkyl, alkoxylalkyl, alkenyl and/or aryl radical bound via a carboxylic-acid ester, carboxylic-acid amide, urethane or urea group, or an optionally substitued (meth) acryl group-containing radical;

A stands for —O— or —NH—.

In particular:

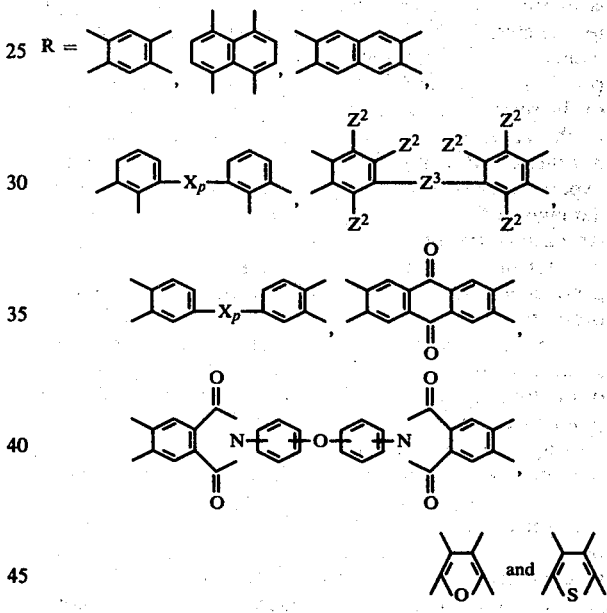

where p=0 or 1 and X stands for one of the following radicals:

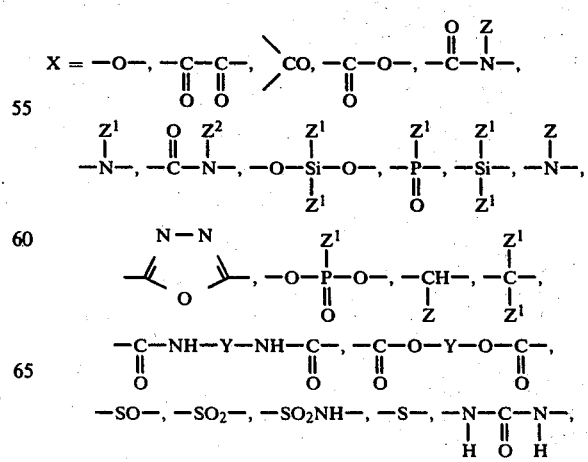

-continued
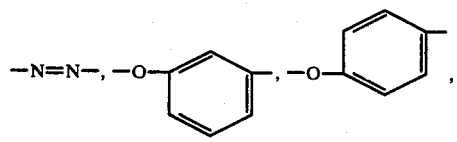
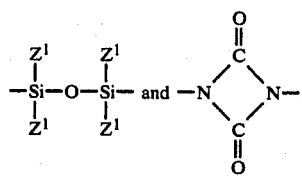
The following applies to the further radicals:
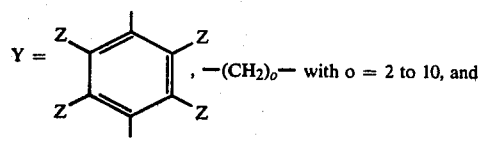  —(CH$_2$)$_o$— with o = 2 to 10, and
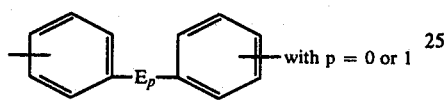 with p = 0 or 1
Z=H or alkyl with 1 to 6 carbon atoms,
Z$^1$=alkyl with 1 to 10 carbon atoms or aryl,
Z$^2$=aryl or hetero aryl, and
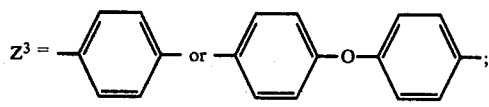
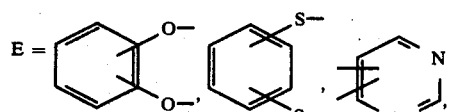
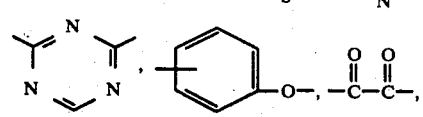
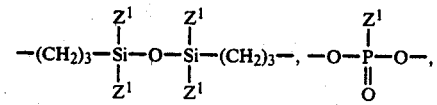
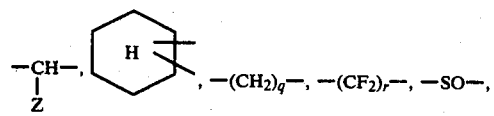
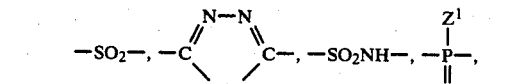
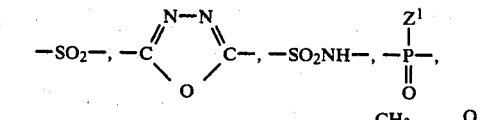
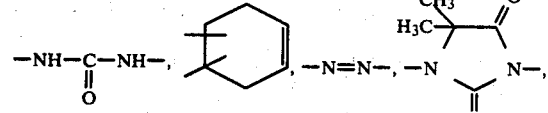
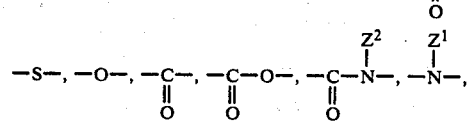
-continued
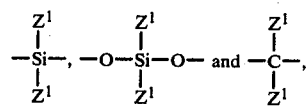
where q=2 to 14 and r=2 to 18; and Z$^1$ and Z$^2$ are as defined above.
R$^1$ = 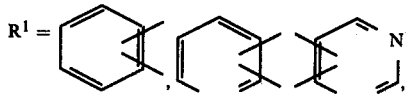
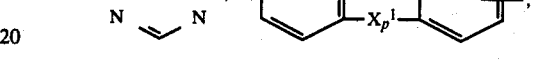
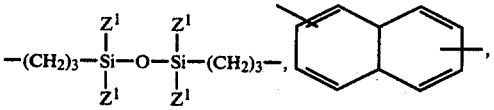
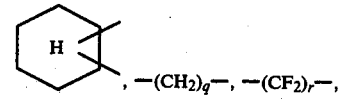
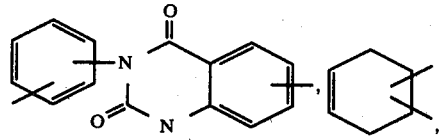
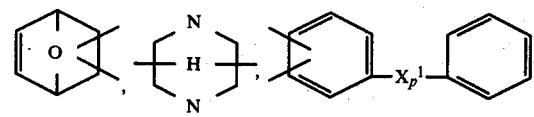
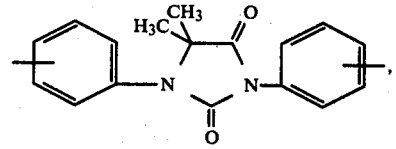
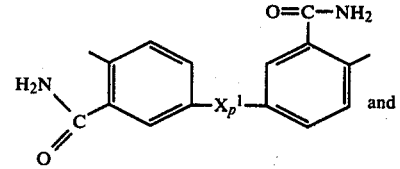
where p=0 or 1, q=2 to 14 and r=2 to 18, and Z$^1$ is as defined above;
X$^1$ = 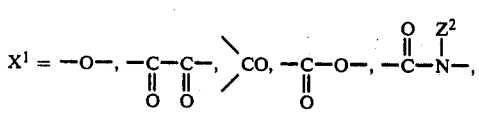

-continued

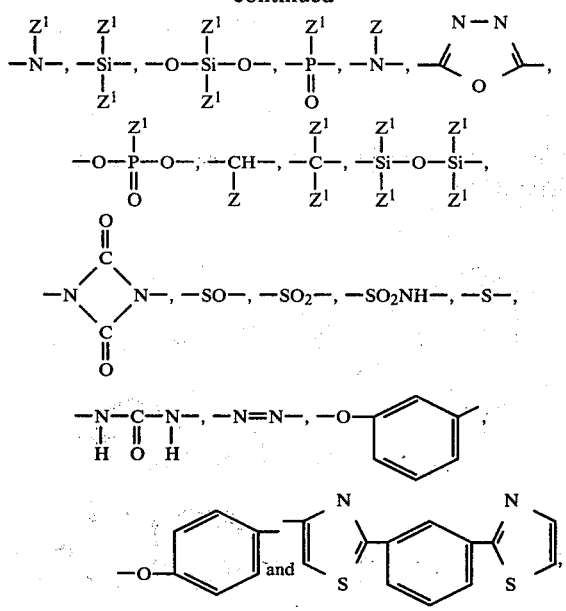

where Z, Z¹ and Z² are as defined above.

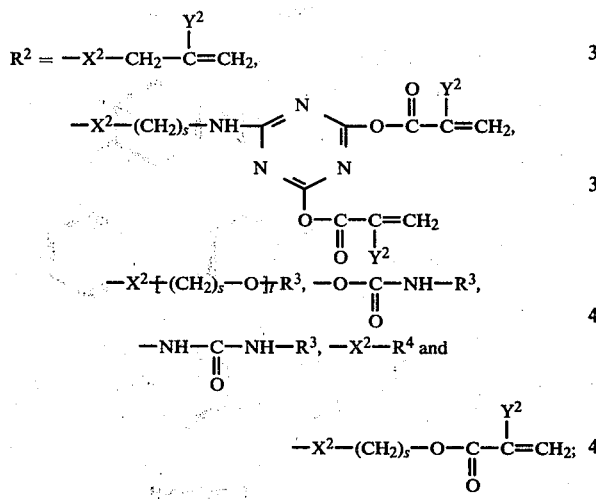

where s=2 to 16 and t=0 to 4;
For the further radicals:
X² =

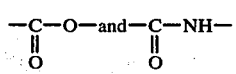

$Y^2 =$ —H and —$CH_3$,
$R^3$ = alkyl, alkenyl and aryl, and
$R^4$ = alkyl with 1 to 18 carbon atoms.

Compounds of the type described above, and specifically those which have radiation-reactive groups bound via carboxylic-acid ester groupings, are known from German Pat. Nos. 23 08 830, 24 37 348 and 24 37 422 and the corresponding U.S. Pat. Nos. 3,957,512; Re. 30,186 and 4,088,489 wherein these compounds serve for the preparation of relief structures consisting of highly heat-resistant polymers.

As already mentioned, the polymer precursor stages are subjected in the heat treatment to a cyclizing process, resulting in the formation of highly heat-resistant polymers. Preferably, such precursors are selected which lead to the following polymer systems: polyimides including polyamidimides and polyester imides, polyisoindoloquinazoline diones, polyoxazine diones, polyquinazoline diones and polyoxazinones.

DETAILED DESCRIPTION OF THE INVENTION

The invention is explained in further detail with the aid of the following, non-limiting embodiment examples.

EXAMPLE I

From pyromellithic-acid dianhydride, β-hydroxyethylmethacrylate and 4,4'-diaminodiphenyl ether, a polyamido carboxylic acid ester with a viscosity number of 21 is prepared in accordance with German Pat. No. 24 37 348. 50 parts by weight of this polyamido carboxylic-acid ester are dissolved in 50 parts by volume dimethylacetamide and filtered under pressure through a 5 μm filter. Subsequently, the solution is placed in a cuvette with a capillary diameter of 180 μm. Through this cuvette, a glass fiber 125 μm thick is pulled with a velocity of 10 m/min. The glass fiber with the solution of the polymer precursor stage on it then first passes through a drying oven with a temperature of about 600° C. and subsequently through a heating section with a temperature of about 400° C. The optical fiber obtained in this manner has a uniform plastic coating of polyimide with a layer thickness of about 20 μm.

EXAMPLE II 50 parts by weight of a polyamido carboxylic-acid ester with a viscosity number of 18 prepared in accordance with German Pat. No. 24 37 348 from pyromellithic acid dianhydride, β-hydroxyethylmethacrylate and 4,4'-diamino diphenyl methane are dissolved together with 2 parts by weight N-phenylmaleinimide and 1 part by weight Michler's ketone in 55 parts by volume N-methylpyrrolidone. This solution is filtered under pressure through a 5 μm filter and applied, as in Example I, to a glass fiber with a diameter of 125 μm. Following the coating curvette, the glass fiber with the solution of the polymer precursor stage on it passes through a centrally arranged UV-light section (with three 500-W very-high-pressure mercury lamps) and is then conducted through an oven with a temperature of about 500° C. In this manner, a uniform coating with a thickness of about 25 μm is obtained.

EXAMPLE III

A polyamido carboxylic-acid ester is prepared according to German Pat. No. 23 08 830 from pyromellithic-acid dianhydride, allyl alcohol and p,p'-diaminodiphenylmethane diisocyanate. 30 parts by weight of this polymer precursor stage are dissolved together with 4 parts by weight triallylcyanurate in 30 parts by volume dimethylacetamide and the solution is filtered under pressure through a 5 μm filter. After coating as in Example I and a heat treatment at a temperature of about 600° C., an optical fiber with a uniform plastic coating of about 19 μm is obtained.

EXAMPLE IV

If 0.5 parts by weight azo-bis-isobutyronitrile are added to the mixture according to Example III prior to filtration, a uniform plastic coating with a thickness of about 22 μm is obtained with an appropriate procedure.

EXAMPLE V 20 parts by weight of a polymer precursor stage of pyromellithic-acid dianhydride, allyl alcohol and 2,4-diamino pyridine according to German Pat. No. 23 08 830 are dissolved together with 2 parts by weight N,N'-bis-(2,4-diallyloxy-s-triazine-6-yl)-diamino-ethane in 25 parts by volume N-methylpyrrolidone and are filtered (5 μm filter). After coating in the manner described above in Example I and a heat treatment at about 600° C., a uniform plastic coating with a thickness of about 21 μm is obtained.

What is claimed is:

1. A method for the manufacture of a high tensile-strength light waveguide having a plastic layer thereon, comprising:
    (a) forming an optical fiber by a fiber drawing process;
    (b) immediately thereafter applying to said fiber, from a solution, a hardenable polymer precursor stage comprising an oligomeric and/or polymeric polyaddition or polycondensation product of
        (1) a carbocyclic or heterocyclic compound carrying two groups selected from carboxyl, carboxylic acid chloride, amino and hydroxyl groups suitable for addition or condensation reaction; and
        (2) a member selected from a diamine, a diisocyanate, a bis-acidchloride and a dicarboxylic acid, said carbocyclic or heterocyclic compound having groupings selected from ester, amide, urethane and urea groupings partially in adjacent position to said groups suitable for addition or condensation reactions; and
    (c) treating said fiber having said hardenable polymer precursor stage thereon by a method selected from irradiation with actinic light and thermal treatment to harden said polymer.

2. The method according to claim 1 wherein monomeric and/or oligomeric mono- or poly-functional cross-linking accelerators are included in said solution.

3. The method according to claim 1 wherein said solvent is selected from dimethylacetamide and N-methylpyrrolidone.

4. The method according to claim 1 wherein a lubricating layer is applied to the plastic layer.

5. The method according to claim 1 wherein said ester, amide, urethane and urea groupings are unsaturated.

* * * * *